United States Patent [19]

Dooley et al.

[11] Patent Number: 4,607,179
[45] Date of Patent: Aug. 19, 1986

[54] GASEOUS ELECTRODE FOR MHD GENERATOR

[75] Inventors: Milton T. Dooley; Nelson A. Bradley; Robert S. Hiers, Jr.; Gary E. Staats, all of Florence, Ala.

[73] Assignee: Reynolds Metals Company, Richmond, Va.

[21] Appl. No.: 894,882

[22] Filed: Apr. 10, 1978

Related U.S. Application Data

[63] Continuation of Ser. No. 643,946, Dec. 24, 1975, abandoned.

[51] Int. Cl.⁴ ............................................. H02K 44/00
[52] U.S. Cl. ....................................................... 310/11
[58] Field of Search ............................................. 310/11

[56] References Cited

U.S. PATENT DOCUMENTS

| | | | |
|---|---|---|---|
| 3,309,545 | 3/1967 | Emmerich | 310/11 |
| 3,462,622 | 8/1969 | Cann et al. | 310/11 |
| 3,505,550 | 4/1970 | Levoy et al. | 310/11 X |

*Primary Examiner*—Donovan F. Duggan
*Attorney, Agent, or Firm*—Alan M. Biddison

[57] ABSTRACT

A gaseous electrode for a magnetohydrodynamic generator is positioned at an angle with respect to the MHD magnetic field thereby causing an arc to move both circumferentially and longitudinally about an inner electrode element within a cavity so that a gas passed through the arc is ionized to form a plasma stream as it enters the generator's main channel. A second gas is introduced into the cavity at either end of the electrode assembly to reduce erosion of the inner electrode.

11 Claims, 6 Drawing Figures

GASEOUS ELECTRODE FOR MHD GENERATOR

This is a continuation of application Ser. No. 643,946 filed Dec. 24, 1975, now abandoned.

BACKGROUND OF THE INVENTION

This invention relates to magnetohydrodynamic generators and, more specifically, to an improved gaseous electrode for such generators.

MHD generators produce electrical power by motion of a high temperature electrically-conductive gas through a magnetic field. This movement induces an electromotive force between opposed electrodes within the generator. The rapid motion of the high temperature gases, however, seriously erodes the generator's electrodes as do internal electric arcs which connect the MHD generator's main plasma stream to a load. Although gaseous electrodes have been suggested in the past, it is an object of this invention to provide an improved gaseous electrode using an electrically conducting gas which does not wear out even though subjected to high generator current densities.

Gaseous electrodes have previously been suggested wherein an arc is caused to move from place to place within a cavity along one or more openings in the electrode, thereby causing ionized gas to fill the entire cavity and be forced into the generator's main channel. Such structures have been described as employing a cathode spot phenomenon according to which the MHD magnetic field causes the arc to move about the inner electrode. It has also been suggested that longitudinal movement of the arc can be controlled by the magnetic field set up by a coil which is wrapped around the electrode. Such structures, however, have not necessarily been as simple or reliable as might sometimes be desired. Hence, it is an object of this invention to provide a gaseous electrode having controlled movement of the arc in both circumferential and longitudinal directions without the requirement of a field-producing coil.

It has also been found that an arc oscillating longitudinally along an inner electrode element of a gaseous electrode can cause erosion of the internal electrode element in the area where the longitudinal arc movement is reversed. Consequently, it is another object of this invention to provide a gaseous electrode which substantially eliminates the problem of erosion on the inner electrode.

SUMMARY OF THE INVENTION

In accordance with principles of the invention, an electrode is positioned at an angle with respect to the MHD magnetic field, thereby causing the electrode's arc to move in both circumferential and longitudinal directions. According to another aspect of the invention, a gas other than the ionized gas is introduced into the electrode chamber at opposed ends of the electrode in order to reduce or eliminate erosion.

BRIEF DESCRIPTIONS OF THE DRAWINGS

The foregoing and other objects, features, and advantages of the invention will be apparent from the following more particular description of preferred embodiments as illustrated in the accompanying drawings in which like-reference characters refer to the same parts throughout the various views. The drawings are not necessarily to scale, emphasis instead being placed on illustrating principles of the invention.

DETAILED DESCRIPTION OF PREFERRED EMBODIMENTS OF THE INVENTION

Figure 1:
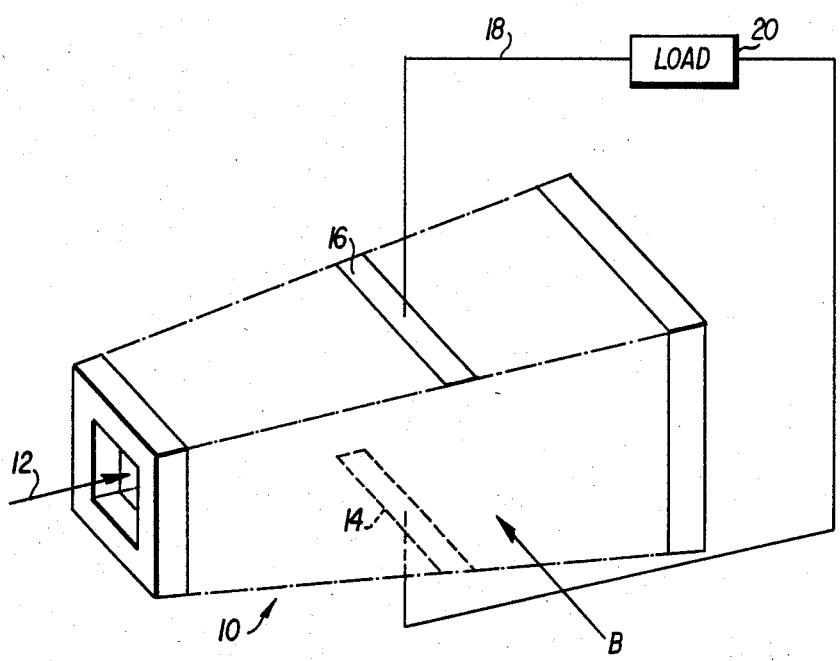
FIG. 1 is a schematic illustration of a Faraday-type MHD generator having segmented electrodes.

A conventional MHD generator is comprised of a duct 10 (FIG. 1) which receives a main stream of high temperature, electrically-conductive plasma at an inlet end as indicated by arrow 12.

By properly choosing the shape and discharge pressure of the duct 10, the plasma can be made to move through the duct at a substantially constant velocity past one or more electrodes such as schematically illustrated segmented electrodes 14 and 16 which are placed in circuit 18 with a load 20.

A suitable magnetic flux, sometimes referred to as a "prime" flux, is represented by an arrow B and placed across the duct in a direction perpendicular to both the plasma flow 12 and the EMF to be generated between the electrodes 14 and 16.

Figure 2:
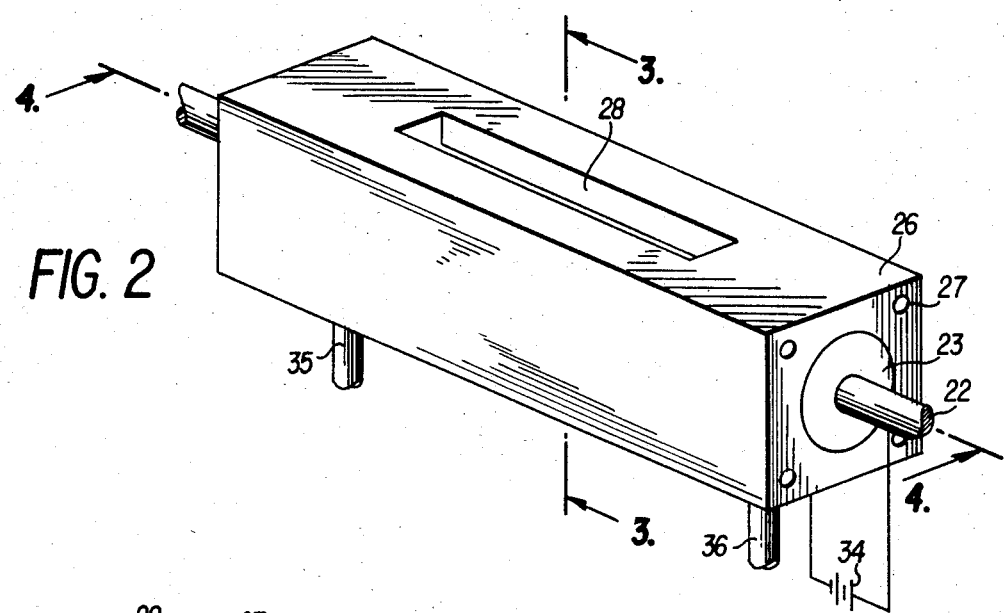
FIG. 2 is a schematic pictorial illustration of an electrode used in the MHD generator of FIG. 1.
Figure 4:
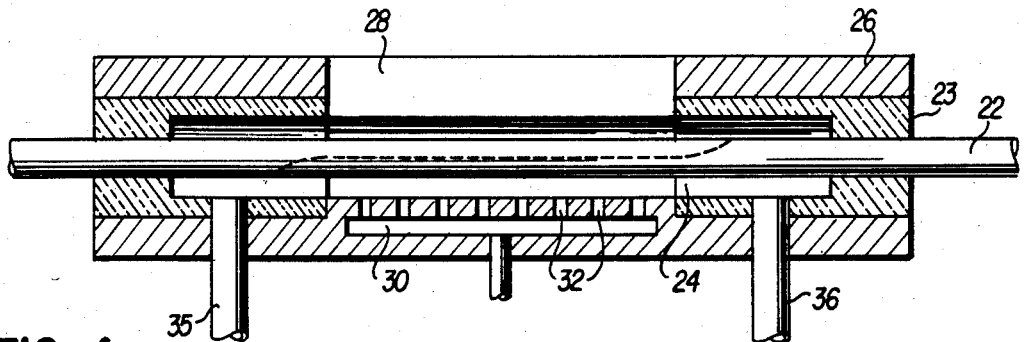
FIG. 4 is a cross-section of FIG. 2 taken along the lines 4—4 thereof.

The electrode of FIG. 2 is comprised of a cylindrical electrode element 22 uniformly spaced by an insulator 23 (FIG. 4) within a cylindrical cavity 24 of a surrounding elongated electrode element 26 provided with passages 27 for a coolant to reduce the structure's temperature. The upper surface of element 26 includes a centrally disposed channel 28 to permit efflux of the electrode's plasma as will now be described.

Figure 3:
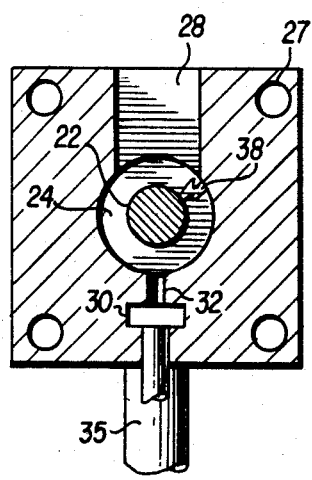
FIG. 3 is a cross-sectional view of FIG. 2 taken along the lines 3—3 thereof.

A gas injector manifold 30 (FIGS. 3 and 4) extends within member 26 and functions to provide a suitable gas—conventionally an inert gas such as argon—through passageways 32 into the cavity 24 where it passes around the central electrode element 22; out of channel 28; and, into the generator itself. In this respect, the central electrode element 22 is negatively biased with respect to electrode element 26 by a battery 34. In this manner, an arc 38 is struck between the two electrode elements 22 and 26; and functions to ionize the gas passing through the cavity 24 between the electrode elements 22 and 26 prior to passage of the resulting plasma out of the channel 28 and into the generator's main duct thereby forming a gaseous electrode.

A significant aspect of the above structure is its "cathode spot" phenomenon. That is, the natural running tendency of the arc 38 causes it to continuously move from place to place within the cavity between the two electrodes 22 and 26—particularly where the central electrode element 22 is made of copper. In previously suggested systems, where the magnetic field vector was parallel to the longitudinal axis of electrode 22, the current density vector of the arc being normal to the surface of electrode 22, a force acted on the arc according to the right-hand rule in a direction tangential to the electrode surface. This tangential force caused a rotation of the arc about electrode 22 in a single plane. In order to move the arc longitudinally along electrode 22, it was suggested that coils be wrapped around the electrode assembly to create a second magnetic field normal to the first.

Figure 6:
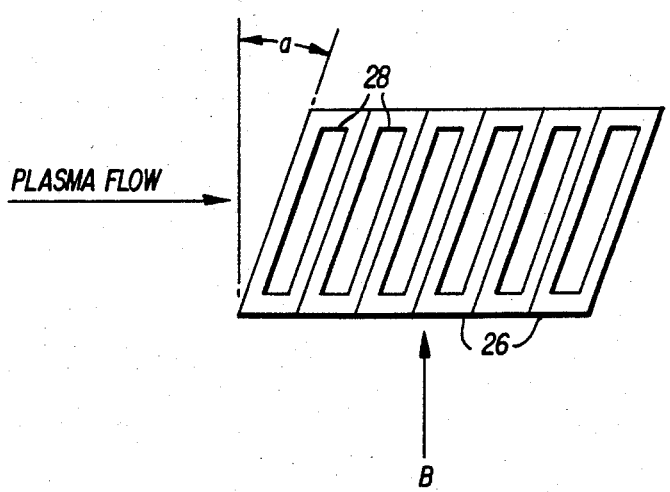
FIG. 6 is a plan view of an electrode wall embodying the invention.

The present invention eliminates the need for a second magnetic-field-producing means by positioning electrode 22 as shown in FIG. 6 at some angle other than 0° with respect to the MHD magnetic field.

Figure 5:
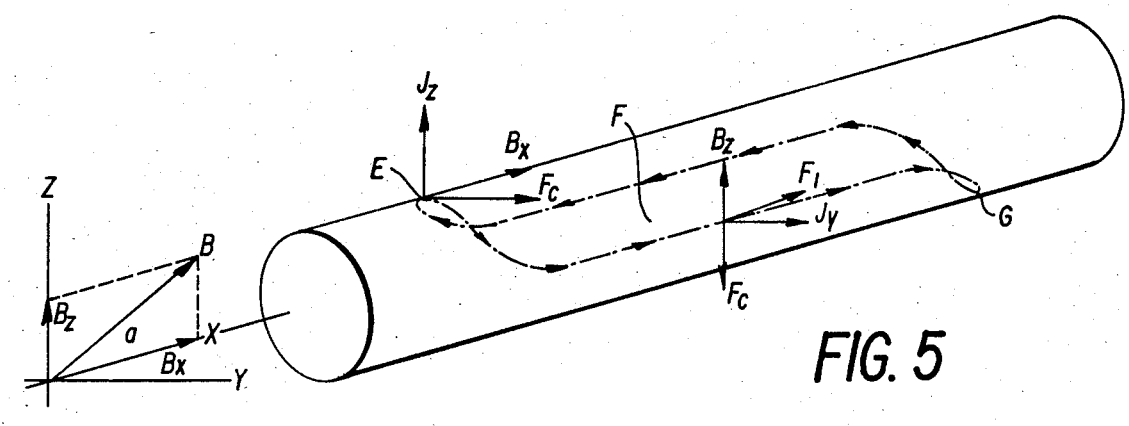
FIG. 5 is an illustration of a vectorial analysis of structure according to the present invention.

FIG. 5 is an illustration of a vectorial analysis of the present invention. Letting "X" be the longitudinal axis of electrode 22, and arbitrarily setting axes "Y" and "Z" normal to axis "X", magnetic field vector "B" is shown in an "XZ" plane at an angle "a" to the "X" axis. The "X" and "Z" components of magnetic field "B" are shown as vectors $B_x$ and $B_z$.

The current density vector "J" of an arc, being at all times normal to the surface of electrode 22, has components along the "Y" and "Z" axis only. Hence, a force acts on the arc in accordance with the left-hand-rule; the magnetic field $B_x$ and a current density $J_z$ will create a force $F_y$, that is a force tangential to the electrode 22; and magnetic field $B_z$ and a current density $J_y$ will create a force on the arc $F_x$, that is a force in the longitudinal direction.

Referring to FIG. 5, two points, "E" and "F" have been chosen as possible locations of an arc to illustrate the above analysis. At point "E", the current density has a single component $J_z$ which, with the magnetic field component $B_x$, creates a force $F_c$ which drives the arc in a circumferential direction. That force is determined by the equation:

$$F_c = J_z \times B_x$$

At point "F", the current density has a single component $J_y$. According to the left-hand-rule, magnetic field $B_z$ and current density $J_y$ create a force $F_1$ in the longitudinal direction. The longitudinal force at this point is $$F_1 = J_y \times B_z$$

At the same point "F", magnetic field $B_x$ acts with current density $J_y$ to create a force $F_c$:

$$F_c = J_y \times B_x$$

It should be realized that at any point between "E" and "F" forces will act on the arc in both the longitudinal and circumferential directions. As a result of these changing forces, the cathode spot is caused to follow a path illustrated by dashed lines in FIG. 5. Hence, the arc moves back and forth along electrode 22 to completely ionize the gas in chamber 24.

It will be realized that longitudinal forces will exist whenever the magnetic field vector "B" has components in the "Y" and/or "Z" directions. Hence, although presently shown in the X-Z plane, vector "B" may lie in any plane through the "X" axis.

FIG. 6 is a plan view of a series of electrodes embodying the present invention. The electrodes are shown to be angled with respect to both the magnetic field and plasma flow, it being realized that the electrodes could alternatively be maintained normal to the plasma flow and angled only with respect to the magnetic field.

It has been found that at points "E" and "G" (FIG. 5) of the cathode spot path, erosion of the electrode 22 may occur; and according to another aspect of this invention, that erosion is substantially eliminated by introducing a gas other than the ionizing gas into either end of the chamber 24. Accordingly, gas inlets 35 and 36 (FIG. 4) are provided.

This second gas is chosen to require a much higher voltage between electrodes 22 and 26 to maintain an arc therebetween. Generally, diatomic gases serve this purpose, and more specifically, nitrogen is well suited. As a result of the higher voltage requirement, the arc is quenched as it reaches either end of electrode 22 and restrikes for reverse longitudinal movement; and with the arc quenched at either end, erosion is substantially eliminated.

While the invention has been particularly shown and described with reference to preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An improvement in an MHD system of the type having duct means for passing a plasma therethrough, means for producing a magnetic field across said duct means, and an electrode assembly comprising:
   a first elongated electrode element located adjacent said plasma stream;
   a second elongated electrode element spaced from said first electrode element;
   means for passing a first gas through the space between said first and second electrode elements;
   exit means for permitting said first gas to exit from between said first and second electrode elements into said duct; and,
   voltage means for striking an arc between said first and second electrode elements for ionizing said first gas and electrically connecting said electrode assembly to said plasma stream:
   said electrode assembly being positioned such that the longitudinal axis of at least one of said elongated electrode elements is at an angle to said magnetic field produced across said duct means, thereby causing said arc to move from place to place along the surface of said elongated electrode in both circumferential and longitudinal directions with respect to said elongated electrode.

2. The improvement in an MHD system of claim 1, further comprising means for introducing a second gas at at least one of the ends of said space between said first and second elongated electrodes said second gas thereby impinging on an end of at least one of said elongated electrodes and requiring a higher voltage to maintain an arc between said elongated electrode elements than said first gas.

3. The improvement of claim 2 wherein said second gas is diatomic.

4. The improvement of claim 3 wherein said gas is nitrogen.

5. A method of operating a gaseous electrode for an MHD system of the type in which a primary magnetic field is produced across a duct means and an arc is struck between first and second electrode elements to ionize a gas passing therebetween, and in which said arc is caused to move from place to place along the surface of at least one of said electrodes, said method comprising the step of:

locating a longitudinal axis of at least one of said electrodes at an angle to said primary magnetic field; and, using said primary magnetic field to cause said arc to move from place to place in both circumferential and longitudinal directions with respect to said surface of at least one of said electrodes.

6. An improvement in an MHD system of the type having an electrode assembly, a duct means for passing a plasma adjacent thereto and means for producing a magnetic field across said duct means, said electrode assembly comprising:

a first elongated electrode element located adjacent said plasma stream;

a second elongated electrode element spaced from said first electrode element;

means for passing a first gas through the space between the first and second electrode elements;

exit means for permitting said first gas to exit from between said first and second electrode elements into said duct;

a voltage means for striking an arc between said first and second electrode elements for ionizing said first gas and electrically connecting said electrode assembly to said plasma stream; and means for introducing a second gas at at least one end of said space between said first and second elongated electrode elements, said second gas thereby impinging on an end of at least one of said elongated electrodes and requiring a higher voltage to maintain an arc between said elongated electrode elements than said first gas.

7. The improvement of claim 6, wherein said second gas is diatomic.

8. The improvement of claim 7 wherein said gas is nitrogen.

9. A method of operating a gaseous electrode for an MHD system of the type in which an arc is struck between first and second electrode elements to ionize a first gas passing therebetween, and in which said arc is caused to move from place to place along the surface of at least one of said electrodes, said method comprising the step of:

introducing a second gas betweeen said first and second electrode elements at at least one end of the space between said electrode elements, said second gas thereby impinging on an end of at least one of said electrodes and requiring a higher voltage to maintain an arc between said elongated electrodes than said first gas.

10. The method of claim 9 wherein said second gas is diatomic.

11. The method of claim 10 wherein said second gas is nitrogen.

* * * * *